United States Patent
Kuriiwa et al.

(10) Patent No.: US 7,112,382 B2
(45) Date of Patent: Sep. 26, 2006

(54) FUEL CELL HYDROGEN RECOVERY SYSTEM

(75) Inventors: Takahiro Kuriiwa, Wako (JP); Ryoji Takenawa, Wako (JP); Toshiaki Shimada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 498 days.

(21) Appl. No.: 10/704,955

(22) Filed: Nov. 10, 2003

(65) Prior Publication Data

(30) Foreign Application Priority Data

Nov. 8, 2002 (JP) .............................. 2002-325680

(51) Int. Cl.
*H01M 8/04* (2006.01)
(52) U.S. Cl. .......................................... 429/24; 429/23
(58) Field of Classification Search ...................... None
See application file for complete search history.

(56) References Cited

FOREIGN PATENT DOCUMENTS

JP        5-225996        9/1993

*Primary Examiner*—Michael Barr
*Assistant Examiner*—Karie O'Neill
(74) *Attorney, Agent, or Firm*—Lahive & Cockfield, LLP; Anthony A. Laurentano, Esq.

(57) ABSTRACT

A fuel cell hydrogen recovery system comprises a primary hydrogen absorbing tank adapted for storing hydrogen discharged from a fuel cell and a secondary hydrogen absorbing tank adapted for storing part of hydrogen that is supplied to the fuel cell. The primary hydrogen absorbing tank and the secondary hydrogen absorbing tank are provided so that heat can be exchanged therebetween. Part of hydrogen that is supplied to the fuel cell is supplied to the secondary hydrogen absorbing tank, so that the primary hydrogen absorbing tank is heated by hydrogen absorbing heat generated when hydrogen is absorbed therein, whereby hydrogen absorbed in the primary hydrogen absorbing tank can be re-supplied to the fuel cell.

14 Claims, 7 Drawing Sheets

FUEL CELL HYDROGEN RECOVERY SYSTEM ACCORDING TO FIRST EMBODIMENT WHICH INCORPORATES A SINGLE HYDROGEN RECOVERY UNIT

RELATIONSHIP BETWEEN HYDROGEN STORAGE TIME AND TEMPERATURE OF MH WHEN MH IS USED FOR STORAGE OF HYDROGEN (UPPER) AND RELATIONSHIP BETWEEN STORAGE TIME AND TOTAL ABSORBING AMOUNT (LOWER)

FUEL CELL HYDROGEN RECOVERY SYSTEM ACCORDING TO SECOND EMBODIMENT WHICH INCORPORATES TWO HYDROGEN RECOVERY UNITS

FUEL CELL HYDROGEN RECOVERY SYSTEM

BACKGROUND OF THE INVENTION

1. Field of the Invention

The present invention relates to a fuel cell hydrogen recovery system which utilizes a hydrogen absorbing alloy adapted for recovering hydrogen (purged hydrogen) which is discharged from a fuel cell.

2. Description of the Related Art

A proton exchange membrane fuel cell (PEFC) has an MEA (membrane-electrode assembly) in which a solid polymer membrane (an electrolyte membrane) is held between an anode and a cathode so that electricity can be generated even at normal temperatures, and therefore, the proton exchange membrane fuel cell can be expected to be used for various applications including an application to a power supply for electric vehicles.

Raised as a method for supplying hydrogen for use as a fuel for the proton exchange membrane fuel cell are a method (of pure hydrogen type) in which hydrogen in the form of pure hydrogen is supplied to a fuel cell from a liquid hydrogen tank which stores therein liquid hydrogen, a high pressure hydrogen tank which stores therein hydrogen under high pressure or a hydrogen absorbing tank which stores therein hydrogen supplied to a hydrogen storage material such as a hydrogen absorbing alloy which absorbs and retains hydrogen in the interior thereof and a method (of reforming type) in which hydrogen rich gas generated from hydrocarbon such as a methanol aqueous solution through a steam reforming process is refined and hydrogen rich gas so refined is then supplied to a fuel cell.

Among automobiles provided with fuel cells to which hydrogen is supplied using the method of pure hydrogen type (hereinafter, referred to as fuel cell vehicles), in a fuel cell vehicle of a highly pressurized hydrogen storage type which has a high pressure hydrogen tank, hydrogen stored in the high pressure hydrogen tank is normally regulated with respect to its pressure in a few steps down to a predetermined pressure before it is supplied to the fuel cell in order to prevent a damage to a fuel cell stack.

In addition, in the fuel cell vehicle constructed as described above, except for a case where the amount of hydrogen stored in the high pressure hydrogen tank is nearly zero, the pressure of hydrogen is reduced from a high pressure condition via a medium pressure condition to a low pressure condition by regulators along a hydrogen supply line which supplies hydrogen from the high pressure hydrogen tank to the fuel cell, and the hydrogen so regulated is further regulated with respect to its pressure down to a lower pressure condition suitable for operation of the fuel cell. A fuel cell system of highly pressurized hydrogen storage type which is adapted for domestic use also has substantially the same construction.

Furthermore, in the proton exchange membrane fuel cell, when a gas containing hydrogen (a fuel gas) is supplied to an anode, whereas an oxidizing agent gas (air) is supplied to a cathode, electrons discharged from the hydrogen gas at the anode to thereby produce protons (ionized hydrogen). Protons produced at the anode pass through the proton exchange membrane (the electrolyte membrane) to reach the cathode together with water, where the protons are oxidized by oxygen in the air to thereby produce water.

Note that since the proton exchange membrane (the electrolyte membrane) always needs to be humidified in order to facilitate the movement of protons through the membrane, the gas containing hydrogen (the fuel gas) and the oxidizing agent gas (air) are humidified before they are supplied to the fuel cell.

While the proton exchange membrane fuel cell is kept at a high temperature by virtue of heat generated through a chemical reaction (thermal reaction) between hydrogen and oxygen in the air when electricity is generated, an electricity generating location of the fuel cell which is closed to an outer peripheral part of the fuel cell is cooled more than a central part thereof. As a result, water in the humidified fuel gas causes a moisture condensation or water produced at the time of generating electricity causes an aggregation along a flow path of hydrogen supplied to the proton exchange membrane fuel cell, and an occlusion of the flow path is caused by water which has so condensed or aggregated to thereby reduce the area of the electricity generating location, leading to a risk that the function of the fuel cell is deteriorated.

In addition, at a cold time such as in winter, there occurs a case where the temperature of the fuel cell lowers below 0° C. while the operation of the fuel cell is stopped. As this occurs, reaction-generated water remaining in the fuel cell gets frozen and then blocks the hydrogen flow path, whereby the fuel cell is not allowed to generate electricity, or such blocking occurs partially along the hydrogen flow path, whereby only portions of the fuel cell is allowed to generate electricity, and the electricity generating portions of the fuel cell are excessively heated relative to the total power output of the fuel cell, leading to a risk of inducing a damage to the electrolyte membrane.

As has been described heretofore, in the event that the hydrogen flow path gets blocked due to water so frozen within the fuel cell, since an unfavorable thing such as a decrease in electricity generating efficiency or power output occurs, there exists, for example, an operating method for feeding an excessive amount of hydrogen which exceeds an amount of hydrogen required for generating electricity to the anode side so as to purge the fuel cell of the excess water which is blocking the flow path together with the excess hydrogen so fed.

After having been used as the means for eliminating the blockage of the hydrogen flow path, hydrogen so discharged from the fuel cell (hereinafter, referred to as purged hydrogen) is desirably recovered for reuse as fuel. To this end, making use of, for example, hydrogen absorbing alloys (hereinafter, referred to as MH) which can store a relatively large amount of hydrogen has been studied as a method for recovering and reusing the purged hydrogen.

There is a technique such as disclosed in, for example, JP-A-5-225996(Pages 1 to 5, FIG. 2) as a fuel cell hydrogen recovery system which utilizes the MH.

As shown in FIG. 7, this fuel cell hydrogen recovery system includes a hydrogen absorbing/discharge means 100 for absorbing and discharging hydrogen substantially continuously under a desired pressure, and this hydrogen absorbing/discharge means 100 includes, in turn, two MH's 101, 102 which are adapted for absorbing or discharging hydrogen, an absorbing changeover means 103 and a discharge changeover means 104 which are adapted for implementing a changeover between a destination to which hydrogen is absorbed and an origin from which hydrogen is discharged as required and mixing means 105, 106 which are adapted for mixing heating water with cooling water at a predetermined ratio which allows the respective MH's 101, 102 to be set to a temperature corresponding to the desired pressure when the heating water and cooling water so mixed together is supplied to the MH's 101, 102.

According to this construction, there can be provided a fuel cell electricity generation system which can enable the stable and economic supply of hydrogen to the fuel cell and which can make the fuel cell smaller in size.

With the fuel cell hydrogen recovery system, however, in order to heat and cool the MH's 101, 102, there are provided the mixing means 105, 106 for mixing heating water with cooling water at the predetermined ratio which allows the respective MH's 101, 102 to be set to the temperature corresponding to the desired pressure, and moreover, special equipment such as a heater or a burner needs to be provided additionally as a heating device for causing recovered hydrogen to be discharged from the MH's.

In addition, since piping is required for supplying and discharging heating water and cooling water, the amount of heat that is dissipated to the outside of the system from the piping so provided becomes large, and this has been not preferable from the viewpoint of energy efficiency.

SUMMARY OF THE INVENTION

The invention was made with a view to solving the problems, and an object thereof is to provide a fuel cell hydrogen recovery system which can obviate the necessity of additionally providing special equipment for heating and cooling hydrogen absorbing alloys and which can suppress the loss of energy that would result when the hydrogen absorbing alloys are activated.

With a view to solving the problems, according to a first aspect of the invention, there is provided a fuel cell hydrogen recovery system comprising a primary hydrogen absorbing tank adapted for storing hydrogen discharged from a fuel cell and a secondary hydrogen absorbing tank adapted for storing part of hydrogen that is supplied to the fuel cell, the primary hydrogen absorbing tank and the secondary hydrogen absorbing tank being provided so that heat can be exchanged therebetween, wherein part of hydrogen that is supplied to the fuel cell is supplied to the secondary hydrogen absorbing tank, so that the primary hydrogen absorbing tank is heated by hydrogen absorbing heat generated when hydrogen is absorbed therein, whereby hydrogen absorbed in the primary hydrogen absorbing tank can be re-supplied to the fuel cell.

According to the first aspect of the invention which provides the fuel cell hydrogen recovery system comprising the primary hydrogen absorbing tank adapted for storing hydrogen discharged from the fuel cell and the secondary hydrogen absorbing tank adapted for storing part of hydrogen that is supplied to the fuel cell, the primary hydrogen absorbing tank and the secondary hydrogen absorbing tank being provided so that heat can be exchanged therebetween, wherein part of hydrogen that is supplied to the fuel cell is supplied to the secondary hydrogen absorbing tank, so that the primary hydrogen absorbing tank is heated by hydrogen absorbing heat generated when hydrogen is absorbed therein, whereby hydrogen absorbed in the primary hydrogen absorbing tank can be re-supplied to the fuel cell, (1) Since a necessity of additionally providing special equipment such as a heater or a burner for heating the primary hydrogen absorbing tank is obviated, it is possible to attempt to decrease the overall size and production costs of the fuel cell hydrogen recovery system;

(2) Since hydrogen absorbing heat in the secondary hydrogen absorbing tank can be used effectively to heat the primary hydrogen absorbing tank, the loss of energy that would result when a hydrogen absorbing alloy is activated can be suppressed to a lower level; and (3) Since hydrogen discharged from the primary hydrogen absorbing tank is reused at the fuel cell, it is possible to provide the fuel cell hydrogen recovery system which can provide a high utilization of hydrogen supplied to the fuel cell.

According to a second aspect of the invention, there is provided a fuel cell hydrogen recovery system as set forth in the first aspect of the invention, wherein hydrogen is discharged from the secondary hydrogen absorbing tank, when hydrogen is absorbed in the primary hydrogen absorbing tank, so as to cool the primary hydrogen absorbing tank.

According to the second aspect of the invention, since the hydrogen absorbing capability of the primary hydrogen absorbing tank can be increased by cooling the primary hydrogen absorbing tank by allowing hydrogen to be discharged from the secondary hydrogen absorbing tank, it is possible to make the hydrogen absorbing tanks smaller in size (and lighter in weight). In addition, the loss of hydrogen can be suppressed to a lower level by returning discharged hydrogen to the fuel cell.

According to a third aspect of the invention, there is provided a fuel cell hydrogen recovery system as set forth in the first or second aspect of the invention, wherein a water removing means for removing water contained in hydrogen discharged from the fuel cell is provided on an upstream side of the primary hydrogen absorbing tank.

According to the third aspect of the invention, since a large amount of water comprising water of formation produced in conjunction with the electricity generating reaction of the fuel cell and water of aggregation discharged from the fuel cell by virtue of purging can be removed on the upstream side of the hydrogen absorbing tank by providing the water removing apparatus on the upstream side of the hydrogen absorbing tank, the aggregation of water within the hydrogen absorbing tank can be suppressed. Consequently, a decrease in the reaction rate of the hydrogen absorbing alloy with hydrogen within the tank can be prevented.

According to a fourth aspect of the invention, there is provided a fuel cell hydrogen recovery system as set forth in any of the first to third aspects of the invention, wherein in the primary hydrogen absorbing tank, part of hydrogen that is supplied to the fuel cell is supplied to the primary hydrogen absorbing tank, so that the hydrogen absorbing alloy within the primary hydrogen absorbing tank is heated by hydrogen absorbing heat, whereby the hydrogen absorbing capability of the hydrogen absorbing alloy is restored.

According to the fourth aspect of the invention, since, in the primary hydrogen absorbing tank, part of hydrogen that is supplied to the fuel cell is supplied to the primary hydrogen absorbing tank, so that the hydrogen absorbing alloy within the primary hydrogen absorbing tank is heated by hydrogen absorbing heat, whereby aggregated water within the hydrogen absorbing tank can be turned into steam again, the aggregated water within the hydrogen absorbing tank can be removed by returning steam so produced to the fuel cell. Consequently, the hydrogen absorbing capability of the hydrogen absorbing alloy within the primary hydrogen absorbing tank can be restored. Note that the temperature at which the hydrogen absorbing alloy is heated by the hydrogen absorbing heat is desirably equal to or higher than 100° C.

DETAILED DESCRIPTION OF THE INVENTION

A fuel cell hydrogen recovery system according to the invention will be described below by reference to the accompanying drawings.

Figure 1A:
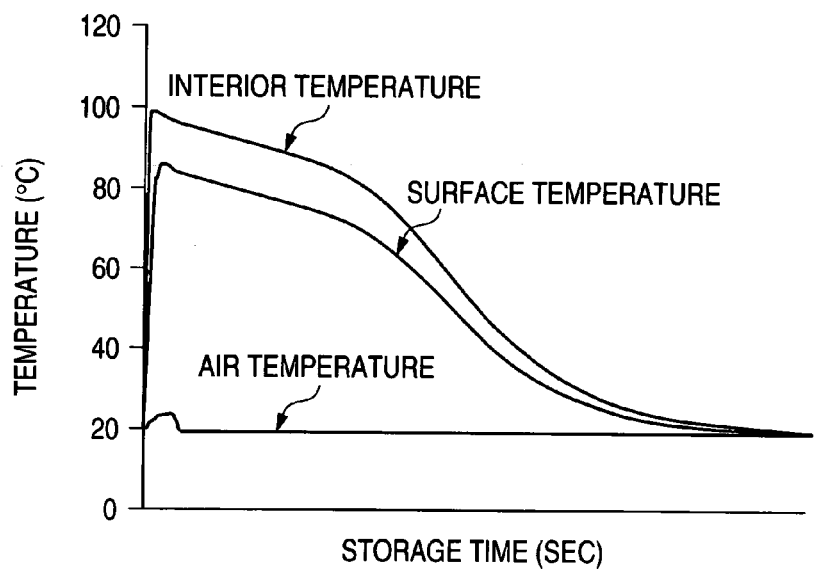
FIG. 1A is a graph illustrating a relationship between storage time and temperature of a hydrogen absorbing alloy according to the invention when hydrogen is absorbed within a hydrogen absorbing tank in which the hydrogen absorbing alloy is accommodated.
Figure 1B:
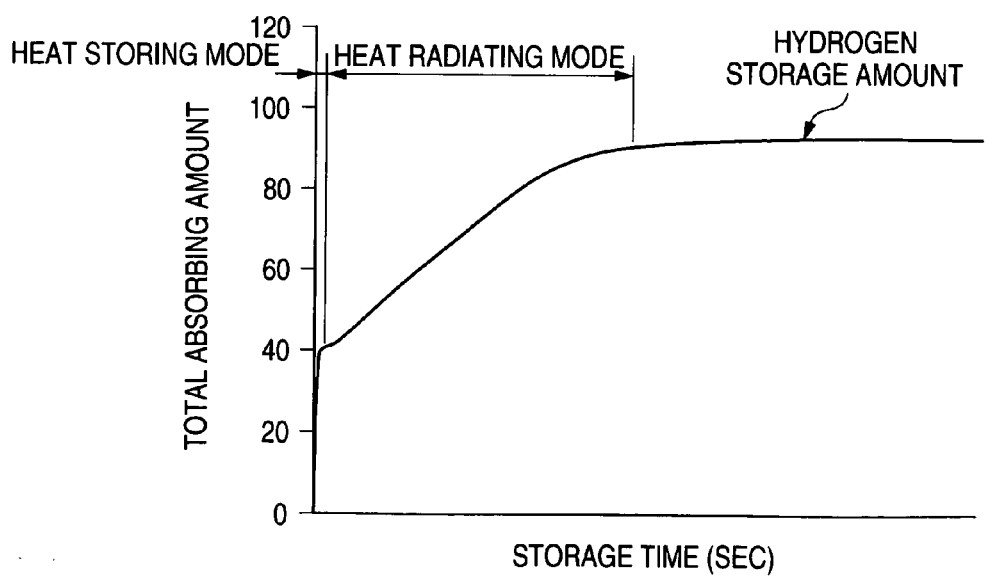
FIG. 1B is a graph illustrating a relationship between storage time and total absorbing amount when hydrogen is absorbed within the hydrogen absorbing tank in which the hydrogen absorbing alloy according to the invention is accommodated.

Note that FIG. 1A is a graph illustrating a relationship between storage time and temperature of a hydrogen absorbing alloy according to the invention when hydrogen is absorbed within a hydrogen absorbing tank in which the hydrogen absorbing alloy is accommodated, and FIG. 1B is a graph illustrating a relationship between storage time and total absorbing amount when hydrogen is absorbed within the hydrogen absorbing tank in which the hydrogen absorbing alloy according to the invention is accommodated.

Figure 2:
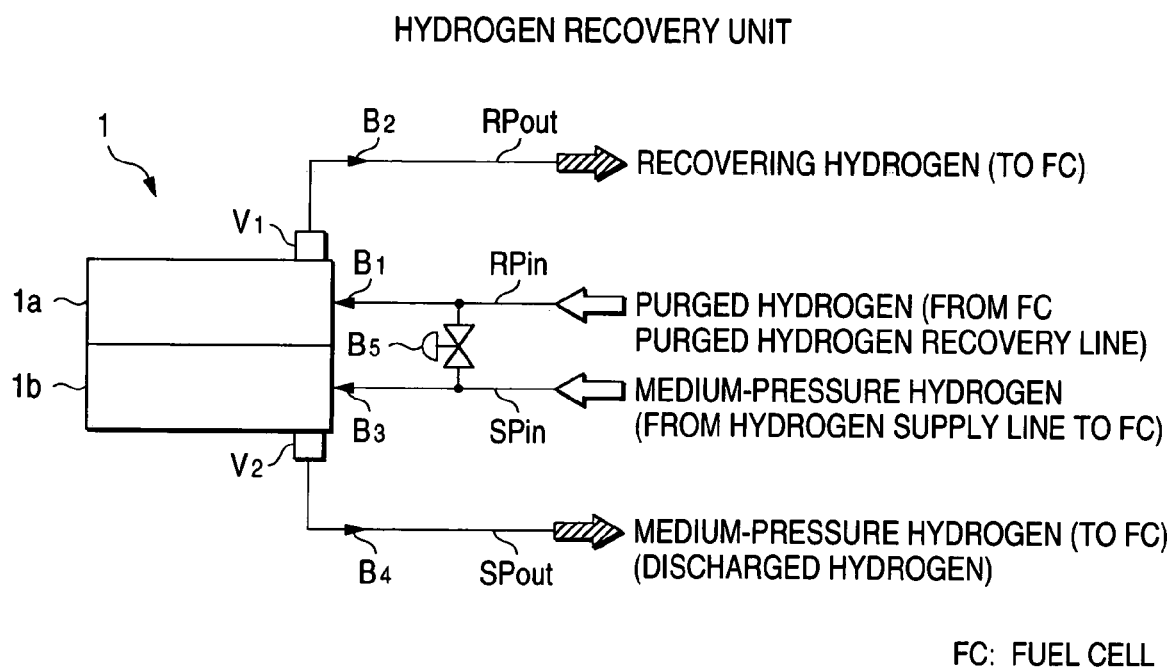
FIG. 2 is a diagram illustrating the construction of a hydrogen recovery unit employing the hydrogen absorbing alloy according to the invention.
Figure 3:
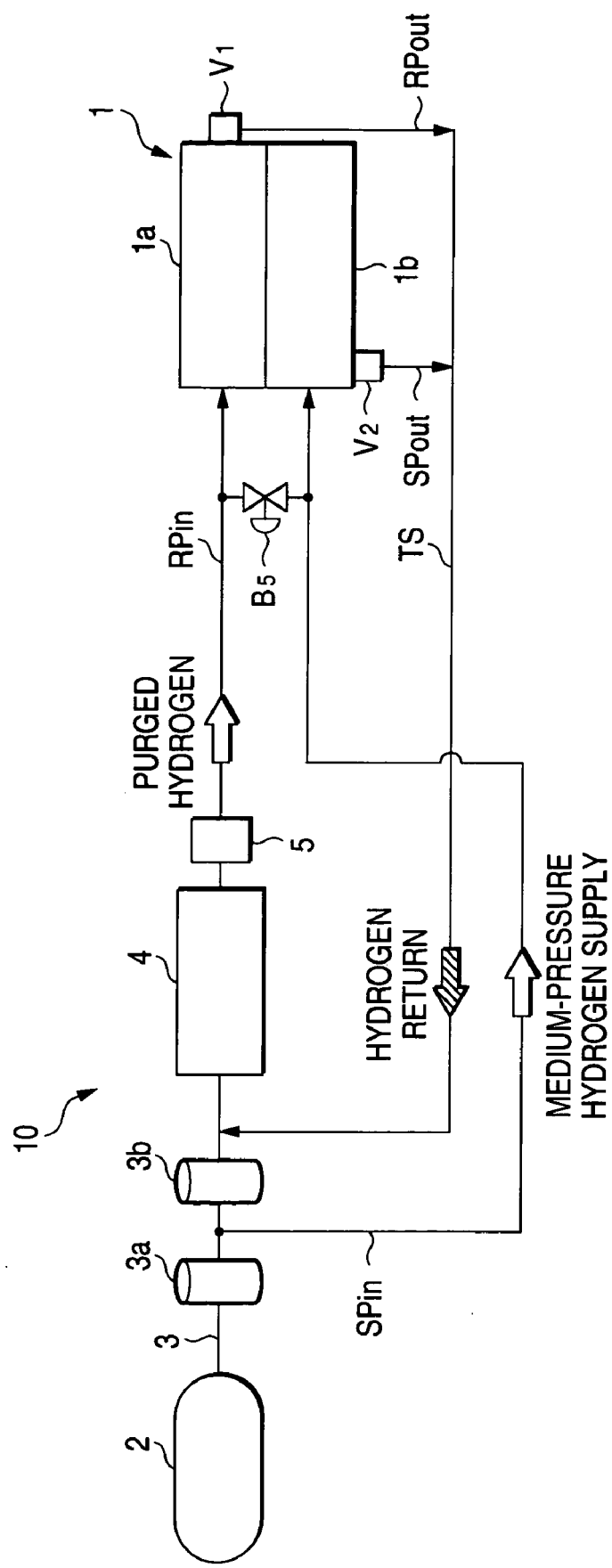
FIG. 3 is a diagram illustrating an overall construction of a fuel cell hydrogen recovery system according to a first embodiment of the invention.
Figure 4:
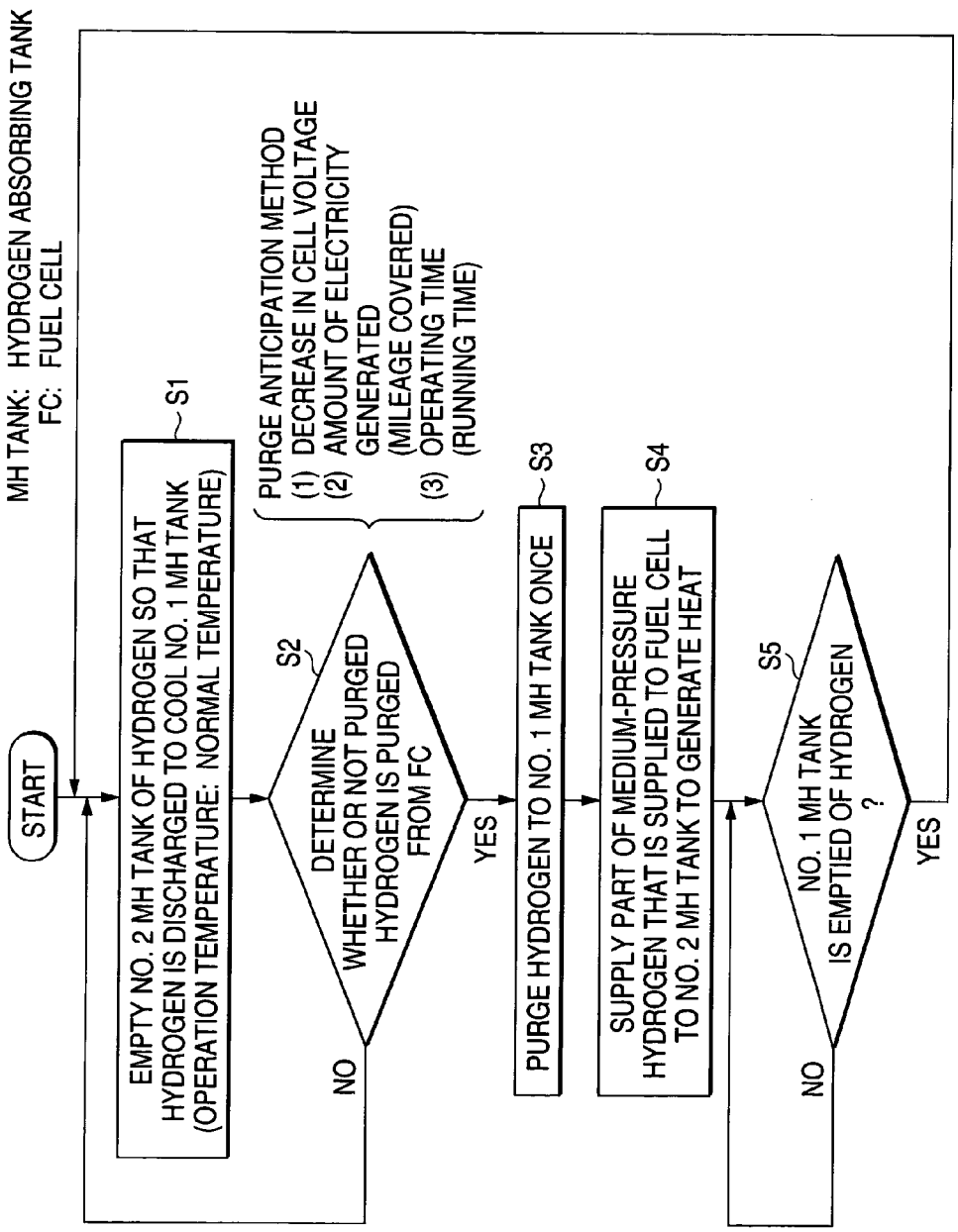
FIG. 4 is a flowchart illustrating the operation of the fuel cell hydrogen recovery system according to the first embodiment of the invention.

In addition, FIG. 2 is a diagram illustrating the construction of a hydrogen recovery unit employing the hydrogen absorbing alloy according to the invention, FIG. 3 is a diagram illustrating an overall construction of a fuel cell hydrogen recovery system according to a first embodiment of the invention, and FIG. 4 is a flowchart illustrating the operation of the fuel cell hydrogen recovery system according to the first embodiment of the invention.

Figure 5:
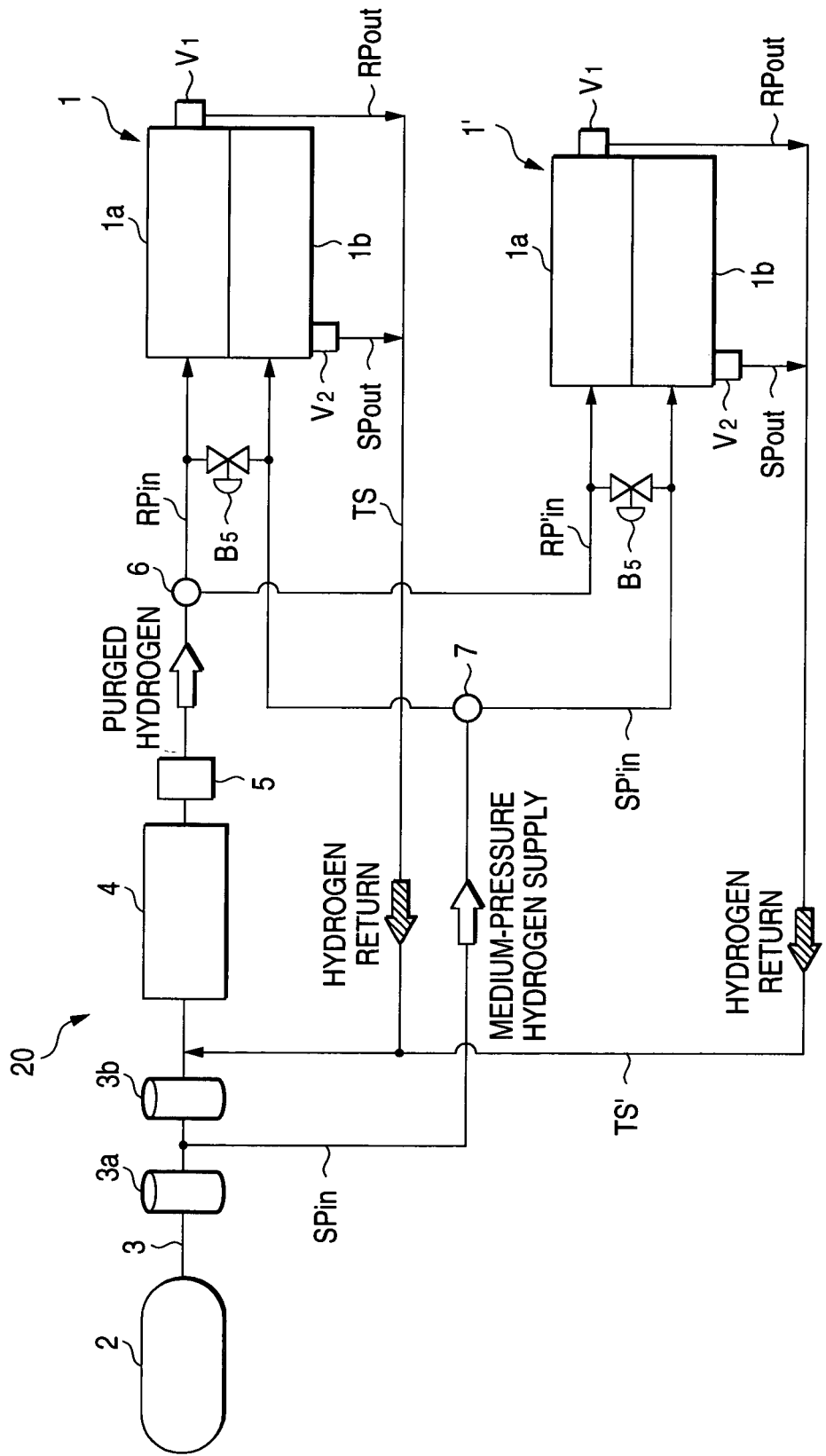
FIG. 5 is a diagram illustrating an overall construction of a fuel cell hydrogen recovery system according to a second embodiment of the invention.
Figure 6:
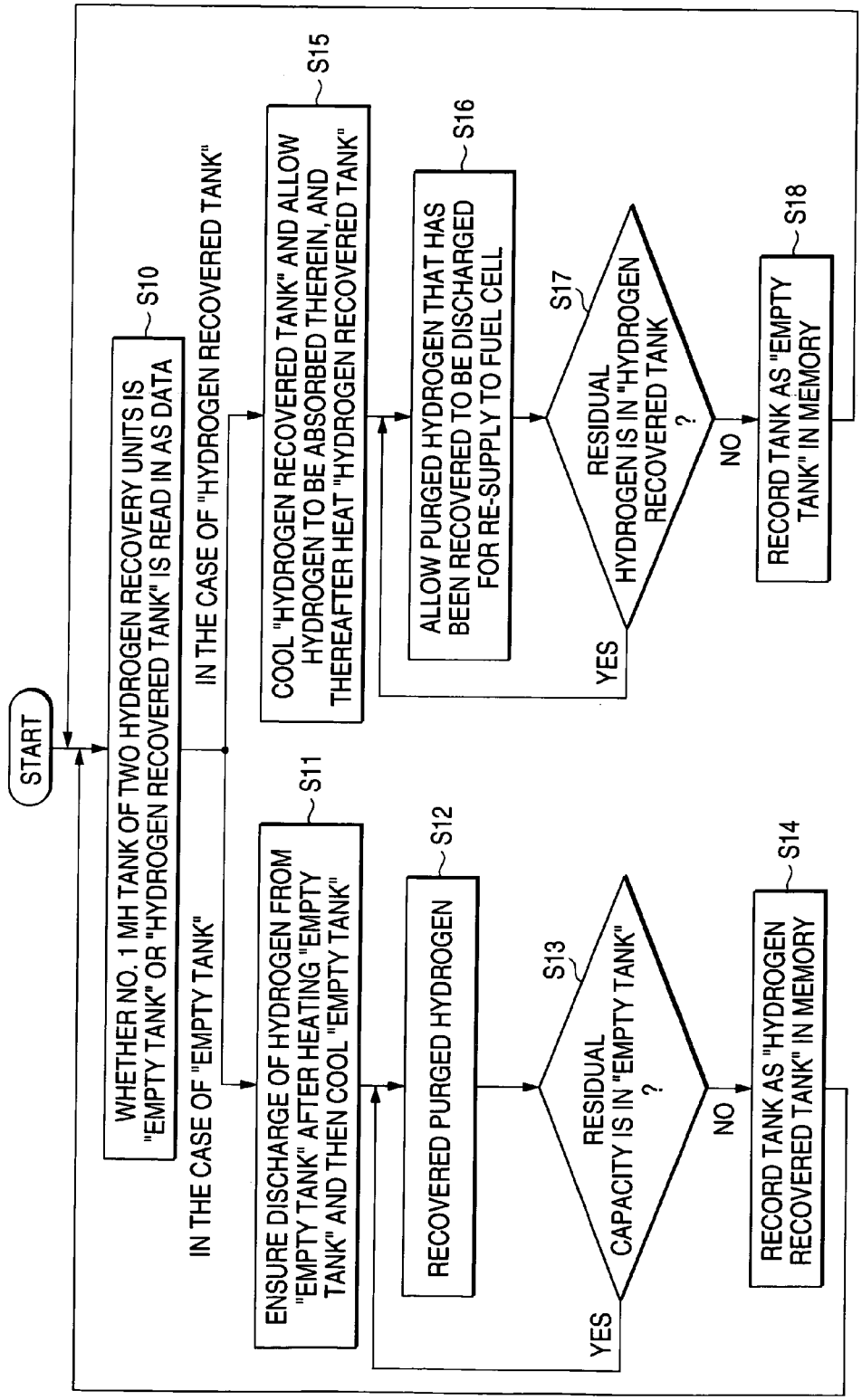
FIG. 6 is a flowchart illustrating the operation of the fuel cell hydrogen recovery system according to the second embodiment.
Figure 7:
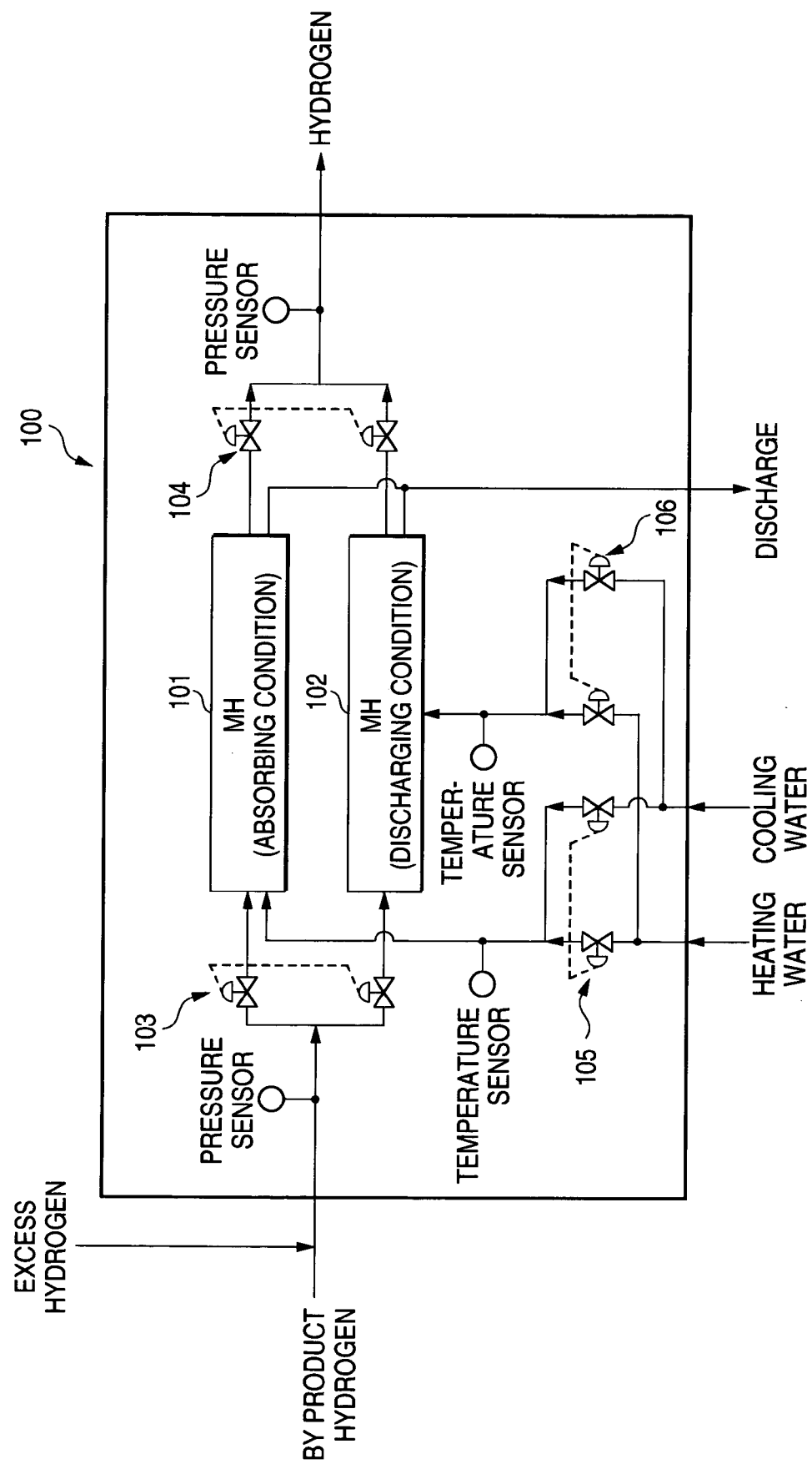
FIG. 7 is a diagram illustrating an overall construction of a fuel cell hydrogen recovery system in the related art.

Furthermore, FIG. 5 is a diagram illustrating an overall construction of a fuel cell hydrogen recovery system according to a second embodiment of the invention, and FIG. 6 is a flowchart illustrating the operation of the fuel cell hydrogen recovery system according to the second embodiment.

Firstly, referring to FIG. 1, a mechanism will be described which is used when hydrogen is stored by employing a hydrogen absorbing tank accommodating an MH in the interior thereof (hereinafter, referred to as an MH tank).

Firstly, the general characteristics of the MH will be described.

The MH absorbs and discharges hydrogen in conjunction with ingress and egress of heat through the following reaction.

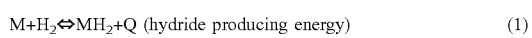

(1)

Based upon the above chemical formula, since heat is generated when hydrogen is absorbed, whereas heat is absorbed when hydrogen is discharged, a method in which an MH is used as a cooling means by making use of this principle is widely known as in an MH type refrigerator and is partially put into practical use.

The operating temperature of the MH changes depending on a hydrogen absorbing pressure and a hydrogen discharge pressure (a plateau pressure) in accordance with the pressure-temperature characteristics of the MH both when hydrogen is absorbed and when hydrogen is discharged. In contrast, when a storage pressure is determined, the operating temperature of the MH is determined, and an application to an MH type heater is attained by making use of the characteristics.

As shown in FIGS. 1A, 1B, the hydrogen storage mechanism in the MH tank is such that as soon as hydrogen is started to be stored, hydrogen is started to be absorbed and the temperature starts to increase, and the temperature of the MH increases quickly to a temperature at which the storage plateau pressure of hydrogen equals the storage pressure thereof based on the pressure-temperature characteristics of the MH.

As this occurs, a reaction heat between the MH and hydrogen (a hydrogen absorbing heat) is consumed to increase the temperature of the MH tank, and a storage through a kind of heat storage is performed (a heat storing mode). Due to this, the heat storage amount of the MH in the heat storing mode is in proportion to a difference in temperature between the temperature of the MH before the storage starts and the operating temperature of the MH, and the operating temperature of the MH is determined by the storage pressure of hydrogen.

After hydrogen is stored through heat storage, the temperatures of respective portions increasing and the temperature at which the storage plateau pressure of hydrogen coincides with the storage pressure thereof being reached, the reaction heat (hydrogen absorbing heat) associated with the storage of hydrogen is radiated to the outside air (atmosphere) from the surface of the MH tank. In the storage of hydrogen through this heat radiation, in the event that the operating temperature of the MH and the temperature of the outside air remain constant, the heat radiation amount is proportional to heat radiation time.

From what has been described heretofore, the mechanism of hydrogen storage by making use of the MH tank becomes a combination of the storage of a certain amount of hydrogen immediately after the storage has been initiated (storage in the heat storing mode) and the storage of hydrogen in proportion to time that has elapsed (storage in the heat radiating mode), as is shown in FIG. 1B.

In addition, the storage pressure of hydrogen in the fuel cell hydrogen recovery system which makes use of the MH (the pressure at which purged hydrogen is recovered) becomes lower than the pressure of hydrogen supplied to the fuel cell due to a pressure loss occurring along the hydrogen flow path in the fuel cell.

From this, in the fuel cell hydrogen recovery system making use of the MH, it is preferable that hydrogen is absorbed at room temperatures (or while being cooled by making use of air flow caused by the vehicle speed), whereas hydrogen is discharged by increasing the hydrogen discharge pressure by making use of waste heat from the fuel cell.

As this occurs, the temperature reached by the MH when hydrogen is absorbed and the operating temperature of the MH when hydrogen is discharged follow the pressure-temperature characteristics of the MH.

However, purged hydrogen has to be recovered quickly, and in the case of the fuel cell hydrogen recovery system employing the MH, heat (generated heat) associated with recovery (storage of hydrogen) enables the recovery of hydrogen through storage of hydrogen in the heat storing mode where hydrogen is stored by heat stored.

A hydrogen recovery unit employing the MH will be described below which unit is such as to be incorporated in the fuel cell hydrogen recovery system according to the invention by reference to FIG. 2.

As shown in FIG. 2, a hydrogen recovery unit according to the invention includes a primary hydrogen absorbing tank (hereinafter, referred to as No. 1 MH tank) $1a$ adapted for absorbing hydrogen discharged from a fuel cell (hereinafter, referred to as purged hydrogen) and a secondary hydrogen absorbing tank (hereinafter, referred to as No. 2 MH tank) $1b$ adapted for storing part of hydrogen that is supplied to the fuel cell, the primary hydrogen absorbing tank and the secondary hydrogen absorbing tank being provided so that heat can be exchanged therebetween.

Thus, heat exchange between the two MH tanks $1a$, $1b$ can be implemented without any waste by providing the tanks adjacent to each other so that heat can be exchanged therebetween.

Note that while the same or different kinds of MH may be used, in this embodiment, an MH whose operating temperature is high is accommodated in the No. 1 MH tank $1a$, whereas an MH whose operating temperature is low is accommodated in the No. 2 MH tank.

Thus, since the operating temperature of the No. 1 MH tank $1a$ can be made higher by accommodating the MH of high operating temperature type and the MH of low operating temperature type in the No. 1 MH tank $1a$ and the No. 2-MH tank $1b$, respectively, the temperature of heat generated when absorbing hydrogen discharged from the fuel cell can be increased, whereby the hydrogen absorbing capability in the heat storing mode can be increased as a result, thereby making it possible to recover hydrogen momentarily.

For example, the MH selected for the No. 1 MH tank $1a$ may be such that its equilibrium temperature reaches in the order of 60° C. when absorbing hydrogen, whereas the equilibrium temperature reaches and exceeds 100° C. when storing medium-pressure hydrogen, and the MH selected for the No. 2 MH tank $1b$ may be such that heat having high temperatures in the order of 85 to 90° C. can be generated when medium-pressure hydrogen is introduced and such that a cold having low temperatures in the order of 25 to 30° C. can be generated when absorbed hydrogen is discharged so as to be re-supplied to the fuel cell.

Laves phase alloys (AB2 type alloys) such as $TiCr_2$, $(Zr, Ti), (Ni, Mn, V, Fe)_2$, $AB_5$ type alloys such as $LaNi_5$, $MMNi_5$ and BCC (body-centered cubic lattice) alloys such as Ti—V—Cr, Ti—V—Cr—Mn can be raised as MH's that can satisfy the operating conditions.

In addition, piping members are provided for the No. 1 MH tank $1a$ and the No. 2 MH tank $1b$, respectively, as will be described below.

An inlet piping $RP_{in}$ and an outlet piping $RP_{out}$ are provided on the No. 1 MH tank $1a$, and a check valve $B_1$ is provided on the inlet piping $RP_{in}$ of the No. 1 MH tank $1a$ and a valve $V_1$ and a check valve $B_2$ are provided on the outlet piping $RP_{out}$ of the No. 1 MH tank $1a$.

On the other hand, inlet piping $SP_{in}$ and an outlet piping $SP_{out}$ are provided on the No. 2 MH tank $1b$, and a check valve $B_3$ is provided on the inlet piping $SP_{in}$ of the No. 2 MH tank $1b$ and a valve $V_2$ and a check valve $B_4$ are provided on the outlet piping $SP_{out}$ of the No. 2 MH tank $1b$.

Furthermore, a gate valve $B_5$ is provided between the inlet piping $RP_{in}$ of the No. 1 MH tank $1a$ and the inlet piping $SP_{in}$ of the No. 2 MH tank $1b$.

Next, referring to FIG. 3, a fuel cell hydrogen recovery system 10 according to the first embodiment of the invention will be described in which a single hydrogen recovery unit such as constructed as has been described is incorporated.

As shown in FIG. 3, the fuel cell hydrogen recovery system according to the first embodiment of the invention includes mainly;

a high pressure hydrogen tank 2 in which high-pressure hydrogen is stored, a hydrogen supply line 3 for supplying hydrogen by decreasing the pressure of the high-pressure hydrogen discharged from the high-pressure hydrogen tank 2 to a hydrogen pressure suitable for a fuel cell 4 via two regulators $3a$, $3b$, the fuel cell 4 in which hydrogen is supplied to an anode, not shown, and air is supplied to a cathode, not shown, so that the hydrogen so supplied reacts with oxygen contained in the air so supplied so as to generate electricity, a hydrogen recovery unit 1 including two tanks such as the No. 1 MH tank $1a$ and the No. 2 MH tank $1b$ which accommodate the hydrogen absorbing alloy, respectively, and which are disposed adjacent to each other so as to exchange heat therebetween, and five pipe lines $RP_{in}$, $RP_{out}$, $SP_{in}$, $SP_{out}$, TS which connect the hydrogen recovery unit 1, the hydrogen supply line 3 and the fuel cell 4.

The high pressure hydrogen tank 2 is a storage container for storing a high-pressure hydrogen such as a hydrogen of 35 MPa, and in this embodiment, a container made from a fiber-reinforced plastic is used in order to decrease the weight and enhance the pressure resistance. In general, a cutoff valve, not shown, is provided.

The two regulators $3a$, $3b$ are pressure-reducing valves for reducing the pressure of high-pressure hydrogen discharged from the high pressure hydrogen tank 2 to a hydrogen pressure suitable for supply to the fuel cell 4 and are provided on the hydrogen supply line 3 which connects the high pressure hydrogen tank 2 with the fuel cell 4. Note that since the high-pressure hydrogen cannot be so reduced in pressure in a single stage, the pressure of the hydrogen is designed to be reduced in two stages by employing the two regulators $3a$, $3b$.

With hydrogen being supplied to the anode, not shown, and air being supplied to the cathode, not shown, the fuel cell 4 produces water when the gases react with catalysts at the electrodes. Chemical energy produced at that time is taken out as electric energy so as to be supplied to an external load for driving.

The hydrogen recovery unit 1 includes the two MH tanks $1a$, $1b$ which accommodate the two different types of MH's, respectively, as has been described above and which are disposed adjacent to each other so that heat can be exchanged therebetween, and the two MH tanks $1a$, $1b$ are, respectively, the No. 1 MH tank $1a$ for recovering purged hydrogen that is discharged from the fuel cell and the No. 2 MH tank for heating and cooling the No. 1 MH tank.

The five pipe lines $RP_{in}$, $RP_{out}$, $SP_{in}$, $SP_{out}$, TS include;

the hydrogen supply line 3 which connect the high pressure hydrogen tank 2, the two regulators $3a$, $3b$ and the fuel cell 4 all together, a purged hydrogen recovery line $RP_{in}$ which connects from an outlet of the fuel cell 4 via a water removing means 5 to the No. 1 MH tank, a medium-pressure hydrogen supply line $SP_{in}$ which branches off between the two regulators 3a, 3b on the hydrogen supply line 3 and connects to the No. 2 MH tank 1b, and a discharged hydrogen re-supply line TS which is a single pipe line which joins, respectively, with the outlet lines $RP_{out}$, $SP_{out}$ of the No. 1 MH tank 1a and the No. 2 MH tank 1b at downstream sides thereof and joins with the hydrogen supply line 3 at a downstream side of the No. 2 regulator 3b.

Here, the water removing means 5 will be described below which is provided on the purged hydrogen recovery line $RP_{in}$ which connects from the outlet of the fuel cell 4 via the water removing means 5 to the No. 1 MH tank.

The water removing means 5 is a device which uses at least one separation means among various types of adsorption materials, a water separation membrane and a mechanical dehumidifying means for removing water contained in purged hydrogen discharged from the fuel cell. A water separation membrane is used in this embodiment.

Referring to an operation flowchart shown in FIG. 4, the fuel cell hydrogen recovery system 10 will be described below which is constructed as has been described above in accordance with to the first embodiment of the invention.

(1) Firstly, in order to cool the No. 1 MH tank 1a, the No. 2 MH tank 1b is heated by making use of waste heat of the fuel cell 4 (or heat from the outside air) so the No. 2 MH tank 1b is emptied of hydrogen stored therein (S1).

Thus, since the hydrogen absorbing capability of the No. 1 NH tank 1a can be increased by cooling the No. 1 MH tank 1a by allowing hydrogen to be discharged from the No. 2 MH tank 1b, the No. 1 MH tank 1a can be made smaller in size (and lighter in weight). In addition, the loss of hydrogen can be reduced by allowing discharged hydrogen to return to the fuel cell 4.

(2) Next, a determination is made as to whether or not purge hydrogen is purged from the fuel cell 4 (FC) (S2).

① Decrease in cell voltage, ② amount of electricit generated (mileage covered when installed in the vehicle), and ③ operation time (running time when installed in the vehicle) are considered as determination conditions when such a determination is made.

(3) If no purge hydrogen is purged from the fuel cell 4, return to step S1.

(4) If purge hydrogen is purged from the fuel cell 4, hydrogen is purged once to the No. 1 MH tank 1a (S3).

As this occurs, since the water separation membrane is provided on the purged hydrogen recovery line RPin for removing a large amount of water comprising water of formation produced in conjunction with the electricity generating reaction of the fuel cell 4 and water of aggregation discharged from the fuel cell 4 due to purging on an upstream side of the No. 1 MH tank 1a, the aggregation of water within the No. 1 MH tank 1a can be suppressed, whereby a decrease in the reaction rate of the MH with hydrogen in the No. 1 MH tank 1a can be prevented.

In addition, in the event that the function of the water separation membrane is deteriorated and hence, the reaction rate of the MH with hydrogen within the No. 1 MH tank 1a is deteriorated, the gate valve B5 provided between the inlet piping $RP_{in}$ of the No. 1 MH tank 1a and the inlet piping $SP_{in}$ of the No. 2 MH tank 1b is opened so that part of the medium-pressure hydrogen is supplied to the fuel cell.

Thus, since water of aggregation within the No. 1 MH tank 1a can be turned into steam again by supplying part of hydrogen that is supplied to the fuel cell 4 to the No. MH tank 1a so as to heat the MH within the No. 1 MH tank 1a by hydrogen absorbing heat, water of aggregation in the No. 1 MH tank 1a can be removed by allowing the steam so produced to return to the fuel cell 4. Consequently, the hydrogen absorbing capability of the MH within the No. 1 MH tank can be restored.

(5) When the purging of hydrogen to the No. 1 MH tank is completed as has been described just above, medium-pressure hydrogen in the hydrogen supply line 3 for supplying hydrogen from the high pressure hydrogen tank 2 to the fuel cell 4 is supplied to the No. 2 MH tank 1b so as to generate heat by hydrogen absorbing heat (S4).

Thus, by heating the No. 1 MH tank 1a by hydrogen absorbing heat,

① Since no hot water is used in heating, special equipment such as a heater or a burner for heating the No. 1 MH tank 1a is not required, and the overall size and production costs of the fuel cell hydrogen recovery system can be attempted to be decreased;

② Since hydrogen absorbing heat in the No. 2 MH tank 1b can be effectively used to heat the No. 1 MH tank 1a, the loss of energy when the MH is activated can be suppressed to a lower level. In addition, since hydrogen absorbing heat is heat exchanged and is then supplied to the No. 1 MH tank 1a to heat the same, the loss of energy that would occur when the MH is activated can be suppressed to a lower level.

③ Since hydrogen discharged from the No. 1 MH tank 1a is re-used in the fuel cell 4, it is possible to provide the fuel cell hydrogen recovery system which can provide a high utilization efficiency of hydrogen that is supplied to the fuel cell.

(6) Whether or not the No. 1 MH tank 1a is emptied of hydrogen is determined (S5).

(7) If the No. 1 MH tank is not emptied of hydrogen, heating is continued until the tank is emptied of hydrogen.

(8) When the No. 1 MH tank 1a is emptied of hydrogen, then the operation is stopped and the flow returns to step S1.

Note that while the exemplary flowchart shown in FIG. 4 is designed to perform the recovery of purged hydrogen once relative to the No. 1 MH tank 1a (an operation in which after a predetermined amount of purged hydrogen is supplied to the No. 1 MH tank 1a, a hydrogen purging cycle for recovering the purged hydrogen is executed one cycle), the hydrogen purging for recovering purged hydrogen maybe carried out several times (an operation in which the hydrogen purging cycle is executed several cycles) depending on the size of the No. 1 MH tank 1a which is a hydrogen storage container.

According to the fuel cell hydrogen recovery system 10 according to the first embodiment of the invention which is constructed to function as has been described just above;

(1) While, in the related art, an electric heater or a burner is needed to allow hydrogen recovered in the No. 1 MH tank 1a to be discharged therefrom, hydrogen is allowed to be discharged without a necessity of providing such an additional special device; and (2) The fuel cell hydrogen recovery system which can suppress the loss of hydrogen to a lower level can be provided by allowing hydrogen supplied to the No. 2 MH tank 1b in order to heat the No. 1 MH tank 1a to return to the fuel cell 4.

Note that while in this embodiment, every time purged hydrogen is recovered from the No. 1 MH tank 1a when the No. 1 MH tank 1a is purged of hydrogen, the hydrogen so purged is designed to be re-supplied to the fuel cell, the invention is not limited to this embodiment only, and the purged hydrogen may be re-supplied to the fuel cell after the purged hydrogen has been recovered several times.

Next, referring to FIG. 5, a fuel cell hydrogen recovery system according to a second embodiment of the invention will be described in which two hydrogen recovery units such as the hydrogen recovery unit according to the invention are incorporated.

Note that the fuel cell hydrogen recovery system 20 according to the second embodiment of the invention differs from the fuel cell hydrogen recovery system 10 according to the first embodiment of the invention in that in the fuel cell hydrogen recovery system 20 according to the second embodiment, two hydrogen recovery units such as the hydrogen recovery system described with respect to the first embodiment are provided in parallel with each other, two changing over valves 6, 7 are provided for alternately performing operations for recovering purged hydrogen and re-supplying the purged hydrogen so recovered to the fuel cell 4, the changing over valves 6, 7 and a No. 2 hydrogen recovery unit 1' are connected to each other via a purged hydrogen recovery line $RP'_{in}$, a medium-pressure hydrogen supply line $SP'_{in}$, and a discharged hydrogen re-supplying line TS of a No. 1 hydrogen recovery unit 1 and a discharged hydrogen re-supplying line TS' of the No. 2 hydrogen recovery unit 1' are caused to join with each other at a downstream side of the No. 2 hydrogen recovery unit 1' so as to connect to a hydrogen supply line 3 at a down stream side of a No. 2 regulator 3b.

Note that in the second embodiment according to the invention, like reference numerals are imparted to like members to those of the fuel cell hydrogen recovery system according to the first embodiment for description thereof.

Thus, the fuel cell hydrogen recovery system 20 according to the second embodiment of the invention has the two hydrogen recovery units 1, 1' which are designed to operate such that while, for example, the No. 1 hydrogen recovery unit (which is identical to the hydrogen recovery unit of the first embodiment) 1 is discharging purges hydrogen that has been recovered therein (during a regenerative operation by a No. 1 MH tank 1a), the No. 2 hydrogen recovery unit 1' recovers purged hydrogen (a recovering operation by a No. 1 MH tank 1a).

In addition, as an operation method other than the method described just above, it is possible to use, for example, three or more hydrogen recovery units so as to adjust the hydrogen recovery capability per one hydrogen recovery unit.

Additionally, completion of recovery of purged hydrogen, start of regeneration and changeover of to the following tank for hydrogen recovery of each MH tank are determined by means of storage amount detecting units such as a thermometer and a strain gauge.

Referring to an operation flowchart shown in FIG. 6, the function of the fuel cell hydrogen recovery system 20 will be described below which is constructed as has been described just above according to the second embodiment of the invention.

(1) Whether the No. 1 MH tank of which of the two hydrogen recovery units is an "empty tank" or "hydrogen recovered tank" is read in as data (S10).
(2) The hydrogen recovery unit whose No. 1 MH tank is an "empty tank" operates as below.
  (a) A medium-pressure hydrogen in the hydrogen supply line 3 for supplying hydrogen from a high pressure hydrogen tank 2 to the fuel cell 4 is supplied to the No. 2 MH tank, so that the No. 1 MH tank is heated by hydrogen absorbing heat to thereby ensure the discharge of hydrogen from the No. 1 MH tank, and thereafter, the No. 2 MH tank is heated by waste heat (or heat of the outside air) from the fuel cell 4 so as to allow hydrogen to be discharged therefrom, whereby the No. 1 MH tank is cooled (S11).
  (b) Hydrogen purged from the fuel cell 4 is recovered into the No. 1 MH tank (S12).
  (c) Whether or not there remains a residual capacity for storing hydrogen in the No. 1 MH tank is verified, and if there still exists a residual capacity, the flow returns to step S12.
  (d) If there remains no residual capacity for storing hydrogen in the No. 1 MH tank, the No. 1 MH tank is recorded in a memory as a "hydrogen recovered tank" (S14), and the flow returns to step S10.
(3) On the other hand, the hydrogen recovery unit the No. 1 MH tank of which is determined to be a "hydrogen recovered tank" operates as below.
  (i) A medium-pressure hydrogen in the hydrogen supply line 3 for supplying hydrogen from a high pressure hydrogen tank 2 to the fuel cell 4 is supplied to the No. 2 MH tank, so that the No. 1 MH tank is heated by hydrogen absorbing heat (S15).
  (ii) Purged hydrogen that has been recovered in the No. 1 MH tank is allowed to be discharged therefrom in an ensured fasion for supply to the fuel cell (S16).
  (iii) Whether or not there exists a residual capacity in the No. 1 MH tank is determined (S17).
  (iv) If there still remains hydrogen, heating is continued, so that hydrogen continues to be discharged from the No. 1 MH tank until there remains no hydrogen therein for re-supply to the fuel cell 4.
  (v) If there remains no hydrogen, the No. 1 MH tank is recorded in the memory as an "empty tank", and the flow returns to step S10.

According to the fuel cell hydrogen recovery system 20 according to the second embodiment of the invention which is constructed to function as has been described just above;

(1) Since there are provided the two hydrogen recovery units, even if an interval at which purged hydrogen is discharged from the fuel cell 4 becomes short, this can be dealt with.

(2) In the related art, an electric heater or a burner is needed to allow hydrogen recovered in the No. 1 MH tank 1a to be discharged therefrom, hydrogen is allowed to be discharged without a necessity of providing such an additional special device; and (3) Hydrogen that is supplied to the No. 2 MH tank 1b so as to heat the No. MH tank 1a is also recovered to be returned to the fuel cell 4, thereby making it possible to provide the fuel cell hydrogen recovery system which loses little hydrogen.

According to the invention, since the fuel cell hydrogen recovery system using the MH's of the related art in which the aforesaid energy recovery has never been carried out is formed into a closed system in which no hydrogen is allowed to escape to the outside of the system by making appropriate use of heat and cold which result when hydrogen is absorbed in and discharged from the MH's, it is possible to provide the fuel cell hydrogen recovery system which can provide a high energy efficiency.

In addition, with a fuel cell hydrogen recovery system such as of the invention in which the plurality of MH tanks are provided, while the hydrogen recovery unit of one of the systems is recovering purged hydrogen, the hydrogen recovery unit of the other system is performing regeneration. In other words, hydrogen is allowed to remain in the hydrogen recovery unit of either of the systems at all times. Then, in the event that hydrogen recovery unit is made to perform regeneration during a cold time such as in the winter, it is possible to warm up the fuel cell with extra heat.

Furthermore, in the event that hydrogen is stored in the hydrogen recovery unit which is scheduled to recover hydrogen without generating electricity but with hydrogen being purged, a heat generating reaction occurring in conjunction with storage of hydrogen can be made use of so as to implement a quicker warming-up of the fuel cell.

According to the invention that is constructed to function as has been described heretofore, the following advantages can be exhibited.

1. According to the first aspect of the invention which provides the fuel cell hydrogen recovery system comprising the primary hydrogen absorbing tank adapted for storing hydrogen discharged from the fuel cell and the secondary hydrogen absorbing tank adapted for storing part of hydrogen that is supplied to the fuel cell, the primary hydrogen absorbing tank and the secondary hydrogen absorbing tank being provided so that heat can be exchanged therebetween, wherein part of hydrogen that is supplied to the fuel cell is supplied to the secondary hydrogen absorbing tank, so that the primary hydrogen absorbing tank is heated by hydrogen absorbing heat generated when hydrogen is absorbed therein, whereby hydrogen absorbed in the primary hydrogen absorbing tank can be re-supplied to the fuel cell, (1) Since a necessity of additionally providing special equipment such as a heater or a burner for heating the primary hydrogen absorbing tank is obviated, it is possible to attempt to decrease the overall size and production costs of the fuel cell hydrogen recovery system;

(2) Since hydrogen absorbing heat in the secondary hydrogen absorbing tank can be used effectively to heat the primary hydrogen absorbing tank, the loss of energy that would result when a hydrogen absorbing alloy is activated can be suppressed to a lower level; and (3) Since hydrogen discharged from the primary hydrogen absorbing tank is reused at the fuel cell, it is possible to provide the fuel cell hydrogen recovery system which can provide a high utilization of hydrogen supplied to the fuel cell.

2. According to the second aspect of the invention, since the hydrogen absorbing capability of the primary hydrogen absorbing tank can be increased by cooling the primary hydrogen absorbing tank by allowing hydrogen to be discharged from the secondary hydrogen absorbing tank, it is possible to make the hydrogen absorbing tanks smaller in size (and lighter in weight). In addition, the loss of hydrogen can be suppressed to a lower level by returning discharged hydrogen to the fuel cell.

3. According to the third aspect of the invention, since a large amount of water comprising water of formation produced in conjunction with the electricity generating reaction of the fuel cell and water of aggregation discharged from the fuel cell by virtue of purging can be removed on the upstream side of the hydrogen absorbing tank by providing the water removing apparatus on the upstream side of the hydrogen absorbing tank, the aggregation of water within the hydrogen absorbing tank can be suppressed. Consequently, a decrease in the reaction rate of the hydrogen absorbing alloy with hydrogen within the tank can be prevented.

4. According to the fourth aspect of the invention, since, in the primary hydrogen absorbing tank, part of hydrogen that is supplied to the fuel cell is supplied to the primary hydrogen absorbing tank, so that the hydrogen absorbing alloy within the primary hydrogen absorbing tank is heated by hydrogen absorbing heat, whereby aggregated water within the hydrogen absorbing tank can be turned into steam again, the aggregated water within the hydrogen absorbing tank can be removed by returning steam so produced to the fuel cell. Consequently, the hydrogen absorbing capability of the hydrogen absorbing alloy within the primary hydrogen absorbing tank can be restored. Note that the temperature at which the hydrogen absorbing alloy is heated by the hydrogen absorbing heat is desirably equal to or higher than 100° C.

What is claimed is:

1. A fuel cell hydrogen recovery system, comprising:
a primary hydrogen absorbing tank adapted for storing hydrogen discharged from a fuel cell; and
a secondary hydrogen absorbing tank adapted for storing a part of hydrogen that is supplied to the fuel cell,
the primary hydrogen absorbing tank and the secondary hydrogen absorbing tank being provided and arranged so that heat can be exchanged therebetween, wherein
the part of the hydrogen that is supplied to the fuel cell is supplied to the secondary hydrogen absorbing tank, so that the primary hydrogen absorbing tank is heated by hydrogen absorbing heat generated when hydrogen is absorbed therein, whereby hydrogen absorbed in the primary hydrogen absorbing tank can be re-supplied to the fuel cell.

2. A fuel cell hydrogen recovery system as set forth in claim 1, wherein hydrogen is discharged from the secondary hydrogen absorbing tank, when hydrogen is absorbed in the primary hydrogen absorbing tank, so as to cool the primary hydrogen absorbing tank.

3. A fuel cell hydrogen recovery system as set forth in claim 1, wherein water removing means for removing water contained in hydrogen discharged from the fuel cell is provided on an upstream side of the primary hydrogen absorbing tank.

4. A fuel cell hydrogen recovery system as set forth in claim 1, wherein in the primary hydrogen absorbing tank, part of hydrogen that is supplied to the fuel cell is supplied to the primary hydrogen absorbing tank, so that a hydrogen absorbing alloy within the primary hydrogen absorbing tank is heated by hydrogen absorbing heat, whereby the hydrogen absorbing capability of the hydrogen absorbing alloy is restored.

5. A method of recovering hydrogen from a fuel cell system, comprising the steps of:
discharging hydrogen from a fuel cell to a primary hydrogen absorbing tank;
supplying hydrogen from a hydrogen supply for supplying hydrogen to the fuel cell to a secondary hydrogen absorbing tank, wherein the secondary hydrogen absorbing tank absorbs the hydrogen to generate heat;
transferring the heat generated by the secondary hydrogen absorbing tank to the primary hydrogen absorbing tank; and
supplying hydrogen absorbed in the primary hydrogen absorbing tank to the fuel cell.

6. The method of claim 5, further comprising to the step of cooling the primary hydrogen absorbing tank.

7. The method of claim 5, further comprising the step of removing water contained in hydrogen discharged from the fuel cell from an upstream side of the primary hydrogen absorbing tank.

8. The method of claim 5, further comprising the step of removing water contained in hydrogen discharged from the fuel cell from an upstream side of the primary hydrogen absorbing tank.

9. The method of claim 5, further comprising the step of supplying a portion of the hydrogen that is supplied to the fuel cell to the primary hydrogen absorbing tank, so that a hydrogen absorbing alloy disposed within the primary hydrogen absorbing tank is heated by hydrogen absorbing heat, whereby the hydrogen absorbing capability of the hydrogen absorbing alloy is restored.

10. A fuel cell recovery system, comprising:
a fuel cell having an inlet and an outlet;
a hydrogen supply line in communication with the inlet of the fuel cell for delivering hydrogen to the fuel cell;
a primary hydrogen absorbing tank having an inlet coupled to the outlet of the fuel cell and an outlet coupled to the hydrogen supply line;
a secondary hydrogen absorbing tank disposed adjacent to and in thermal communication with the primary tank so as to exchange heat therebetween, the secondary hydrogen absorbing tank having an inlet and an outlet connected to the hydrogen supply line.

11. The fuel cell recovery system of claim 10, further comprising water removing means for removing water contained in hydrogen discharged from the fuel cell provided on an upstream side of the primary hydrogen absorbing tank.

12. The fuel cell recovery system of claim 10, further comprising at least one pressure regulator coupled to the hydrogen supply line for controlling the pressure of hydrogen within the hydrogen supply line.

13. The fuel cell recovery of claim 10, further comprising a discharged hydrogen re-supply line for coupling the outlet of the primary hydrogen absorbing tank and the outlet of the secondary hydrogen absorbing tank with the hydrogen supply line.

14. The fuel cell recovery system of claim 10, further comprising a gate valve disposed between the inlet of the primary hydrogen absorbing tank and the secondary hydrogen absorbing tank for selectively allowing hydrogen flow therethrough.

* * * * *